Figure 1:
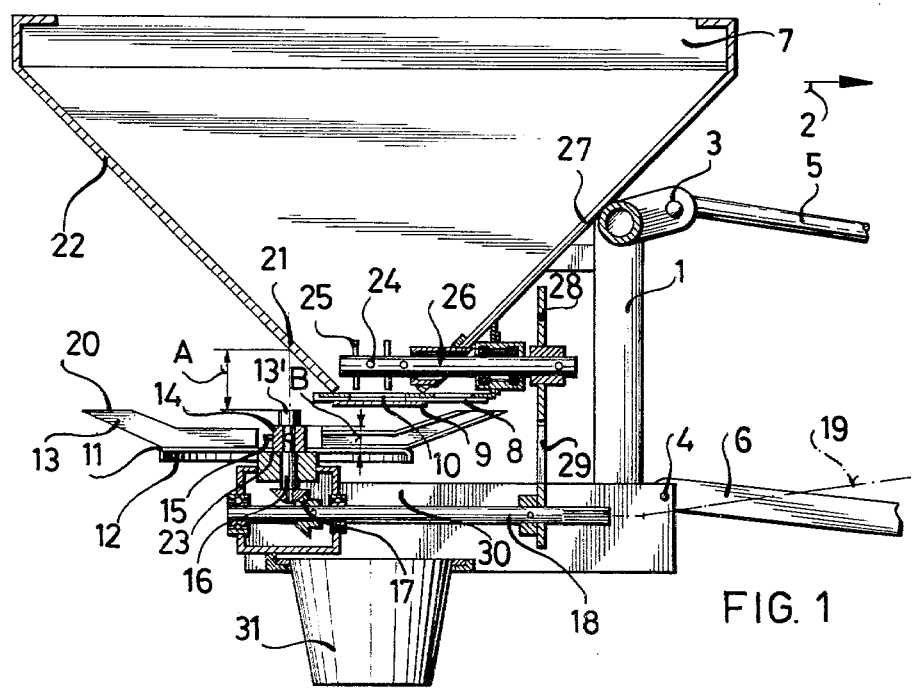

United States Patent [19]

Dreyer

[11] 4,351,481
[45] Sep. 28, 1982

[54] CENTRIFUGAL SPREADER, ESPECIALLY FOR GRANULATED FERTILIZERS

[75] Inventor: Heinz Dreyer, Hasbergen-Gaste, Fed. Rep. of Germany

[73] Assignee: Amazonen-Werke, Hasbergen-Gaste, Fed. Rep. of Germany

[21] Appl. No.: 64,680

[22] Filed: Aug. 8, 1979

[30] Foreign Application Priority Data

Aug. 10, 1978 [DE] Fed. Rep. of Germany ....... 2835011

[51] Int. Cl.$^3$ ............................................. A01C 17/00
[52] U.S. Cl. .................................... 239/670; 239/683
[58] Field of Search ............... 239/668, 670, 676, 679, 239/681, 683

[56] References Cited

U.S. PATENT DOCUMENTS 2,766,872 10/1956 Pillsbury .......................... 239/681 X
3,310,314 3/1967 Bylsma ................................ 239/683

Primary Examiner—Richard A. Schacher

Attorney, Agent, or Firm—Sprung, Horn, Kramer & Woods

[57] ABSTRACT

A centrifugal spreader (FIG. 1) for spreading granulated fertilizers has a funnel-shaped hopper, a discharge outlet in the lower portion of the hopper, and adjustor means for adjusting the size of and shutting off the outlet. A drivable agitator is disposed in the hopper, and spreading means 11 is disposed beneath the hopper for receiving fertilizer issuing from the outlet and spreading the fertilizer. The spreader 11 is releasably mounted on a drive shaft 16 and is exchangeable for a different spreading means. The spreader can be set in a position in which the distance (A) between the highest point of the spreader and the part of the hopper situated above said highest point as seen longitudinally of the drive shaft, is greater than the distance (B) between the lower edge of the fastening means 14 which releasably secures the spreader on the drive shaft, and the upper end of the drive shaft. Thereby removal of the spreader is facilitated.

20 Claims, 8 Drawing Figures

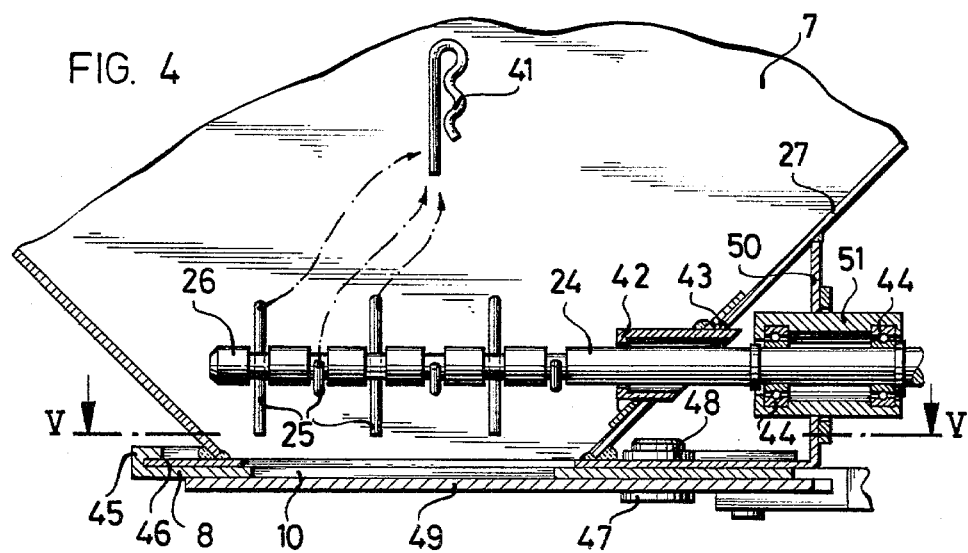
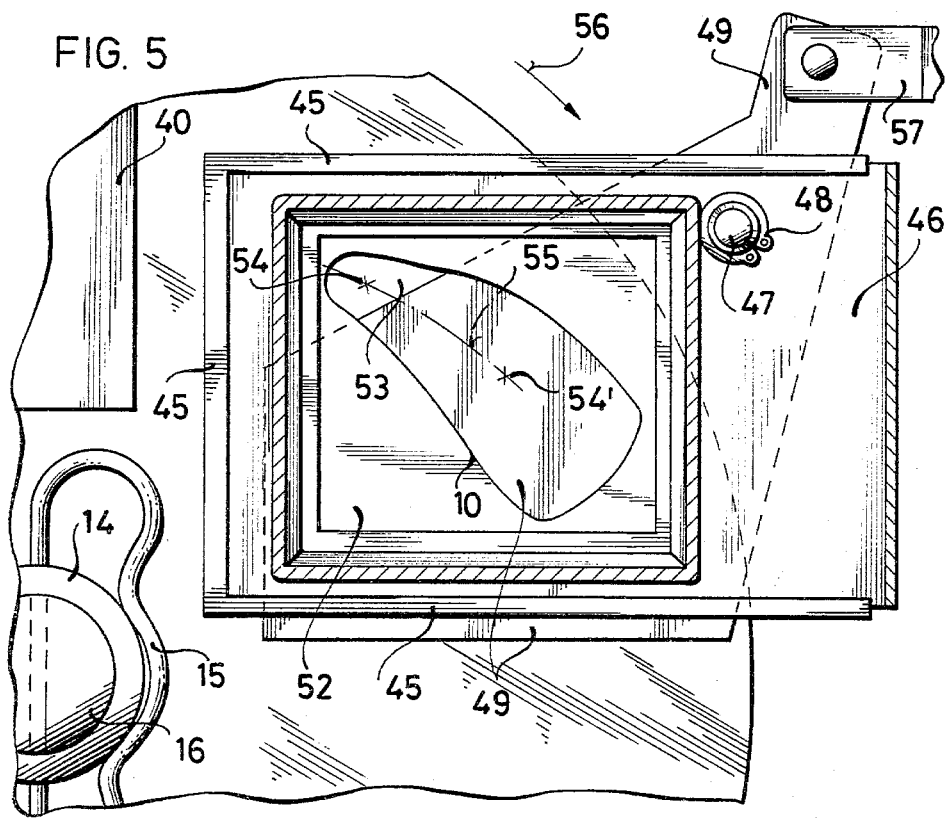

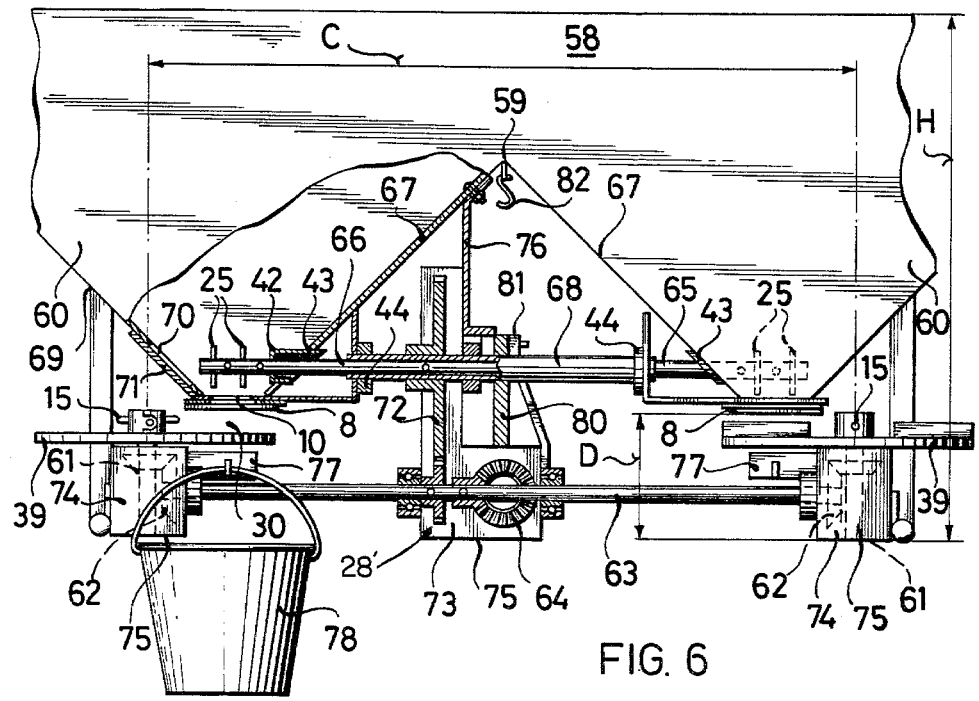

CENTRIFUGAL SPREADER, ESPECIALLY FOR GRANULATED FERTILIZERS

The invention relates to a centrifugal spreader, especially for granulated fertilizers, which has a funnel-shaped hopper in whose lower portion at least one discharge outlet is provided which can be adjusted to various aperture sizes and shut off, and in which a drivable agitator is situated and underneath which there is disposed at least one spreading means which can be driven in rotation, the agitator being driven at a substantially lower speed than the spreading means when in operation, and the drive shaft on which the spreader means is mounted terminates outside of the hopper.

Such a centrifugal spreader is already known through Great Britain Pat. No. 1,022,777. In this centrifugal spreader the hopper is equipped with a bottom plate in which there are two discharge outlets with a disk-shaped spreader means under each.

It is advantageous in this known centrifugal spreader that granulated fertilizers can be delivered by them at low rates without being broken or ground up due to the greater length of time which they spend in the area of the agitator. It is thus also possible to keep a discharge outlet closed over a relatively long period of time, as for example for the duration of a single trip across a field, so that the fertilizers are flung substantially only rearwardly and to one side during this trip. Such unilateral spreading is advantageous when fertilizing the marginal strips of a field, for the purpose on the one hand of providing these strips with an at least approximately sufficient amount of fertilizer, and on the other hand of preventing a greater amount of fertilizer from being spread beyond the marginal strips to an adjacent area.

However, it is disadvantageous in this centrifugal spreader that each individual type of fertilizer can be spread uniformly over the soil only within a relatively narrow range of spreading widths. This disadvantage is particularly felt when using the so-called "driveway" method. If a seed drill having a working width of 3 m is used, for example, for the planting of a field, and, assuming that the machines that follow have a working width of 12 m, the operator adds a "driveway" after every fourth run, it is possible with the known centrifugal spreader in this "driveway" method to spread uniformly over the surface of the ground only medium and coarse types of fertilizer having a specific smoothness, but not fine types or those types in which the grains have an especially smooth surface. This is to be attributed to the fact that, for the same initial velocity, fine and very fine fertilizer grains are applied to the ground over a substantially lesser spread width than coarser grains, while in the case of smooth fertilizer grains a considerable narrowing of the spreading fan angle results, and hence likewise a correspondingly lesser spread width.

Furthermore, in the case of such a reduction of the spreading width at an identical setting of the discharge apertures, the amount discharged per unit of surface area is increased. Nevertheless, a set conversion factor cannot be given for it, because with the individual types of fertilizer having different trajectories changes also result in the ratio between the maximum spreading width and the spreading width. For this reason, not only is it impossible to use the known centrifugal spreader in every case for spreading operations in the "driveway" method, but even when this method is not used, and types of fertilizer are used which appear different to the eye, the setting of the discharge apertures and the actual spreading widths obtainable in each particular case have to be determined by time-consuming test runs.

Furthermore, a lawn seeding machine is disclosed by German petty Pat. No. 6,600,610, which is to be equipped with a hopper and two spreading means in the form of disks, the spreading means being fastened to their drive shafts for easy release therefrom, so as to make it possible on the one hand to perform nearly the entire care and maintenance of lawn in parks with the same machine, and on the other hand to enable mowing work to be performed without the encumbrance of the functional parts necessary for other operations. For this reason all that need be done is to disassemble the hoppers from the machine and then remove the spreader means.

Now, it is the object of the invention to improve the known centrifugal spreaders in a simple manner such that a given, specific, effective spreading width will be achieved for all granulated fertilizers commonly used in agricultural practice, while maintaining precisely the rate of application per unit of area once it has been set.

This object is achieved in accordance with the invention in that the spreader means is fastened on its drive shaft for easy removal in a known manner, and that the spreader means is interchangeable with other spreader means and can be set in a position in which there is an open space between its maximum height and a fixed part of the centrifugal spreader located above this height, as seen longitudinally of its driven shaft, which is greater than the distance between the bottom edge of the fastening means of the spreader means and the upper end of its driven shaft.

As a result of these measures, only spreader means precisely adapted to granulated fertilizer types that are very different from one another need to be present, and the basic adaptation work and classification system can be worked out by the manufacturer. All that then remains for the farmer to do, in addition to setting the spreader for a particular rate of application, is the work of changing the spreader means. This work, however, can be performed quickly and conveniently by virtue of the measures set forth above, without the need for any other disassembly of the hopper or other parts of the machine.

If the hopper of the centrifugal spreader is equipped with a bottom plate in which the outlet opening or openings are situated, the invention furthermore provides that the maximum opening size of all outlet openings amounts to at least one-fourth of the bottom inside area of the hopper. Thus the rates of discharge will remain constant while the hopper is emptying, and so will the evenness of the spreading, until only small amounts remain in the hopper. And even these small amounts can then be removed virtually entirely without the need for manual intervention.

If the bottom plates are fastened to the hopper in an easily removable manner, they are easily replaceable with other bottom plates having outlet opening shapes better suited for particular types of materials, for example, in the form of so-called microgranulated herbicides, fungicides or insecticides, which are supposed to be applied in very small quantities. In this case it is advantageous for ease of operation and also for the replacement of the bottom plates if the bottom plates consist of corrosion-resistant material.

Now, it has proven desirable in agricultural practice to use the so-called trial run method in order to determine precisely the size of the aperture of the outlet openings to use for the desired rate of application per unit of surface area, on account of the variation in the specific weight and free-flowing characteristics of the individual types of fertilizers even when the effective spreading widths of the centrifugal spreader are equal or presettable and precisely maintainable. This so-called trial run method can be performed in a simple manner, with the machine standing still, without any special means for covering the spreader disks and without the otherwise usual loss of a certain amount of fertilizer, if, after the removal of the spreader disk from its shaft, a free space remains beneath the outlet opening or openings of the hopper, for the discharge of the fertilizer from the outlet opening or openings. If, then, at least one catching container can be attached beneath the outlet opening or openings, there will be absolutely no risk of the loss of a certain amount of fertilizer through the test run.

Furthermore, in the case of a centrifugal spreader in which the agitator can be driven in rotation, the invention provides that the agitator will have a maximum rotatory speed of 300 revolutions per minute in operation. In this manner a sufficient agitation of the fertilizer is assured on the one hand, and on the other hand the comminution of the fertilizer grains is prevented even in the case of relatively large agitators. Also, the friction heat produced by the agitation of the fertilizer will remain below the critical limit above which caking of the fertilizer particles might occur.

In a preferred embodiment of the invention, the agitator is equipped in a manner disclosed by Great Britain Pat. No. 1,089,302 with a plurality of agitator elements disposed for easy removal on its shaft. This measure permits adaptation of the operation of the agitator to the type of fertilizer that is to be spread, without the caking of the fertilizer which takes place due to friction heat in the machine specified in the said British patent.

In this embodiment, the shaft of the agitator is, in accordance with the invention, to be introduced laterally into the hopper in a manner known in itself through Great Britain Pat. No. 733,935. But the result in the case of the centrifugal spreader of the invention is a simple achievement of adaptability of the operation of the agitator to the nature of the individual types of granulated fertilizers and, in conjunction with the measures set forth above, especially the low rotatory speed of the agitator elements, an especially gentle treatment of the fertilizer types in the spreading procedure.

In contrast, the same measures in the case of the centrifugal spreader according to British Pat. No. 733,935 do not achieve the advantages set forth above. This is because the same rotatory speeds are produced in the agitator and in the spreader by the transmission ratios provided within the drive means, both in the case of the derivation of the drive from the ground wheel of the machine and in the case of the drive obtained from the standard power take-off of the tractor drawing the centrifugal spreader. As a consequence of this, either the fertilizers are delivered to the soil over only a small effective width, in spite of the large outside diameter of the disk-like spreader means, and spreading irregularities cannot be avoided, or, despite the advantageous arrangement of the agitator elements, caking of the fertilizers is produced in the bottom portion of the hopper, which adversely affects the spreading operation if it does not stop it entirely.

An especially simple achievement of adaptability of the agitator to the characteristics of the individual types of granulated fertilizers is achieved by making the agitator elements to consist of spring pins. To increase or reduce the agitating action it is necessary only to insert the appropriate number of spring pins into the agitator shaft or remove some therefrom. This also achieves the advantage that, when any agitator elements become worn out, the farmer does not have to order replacements from the manufacturer of the centrifugal spreader, but can purchase the agitator elements in any farm equipment supply store, since they are standard, mass-produced articles.

Furthermore, in accordance with the invention, a packing is removably disposed adjacent each outlet of the hopper for the insertion of the agitator shaft, the bearings of the shaft being situated outside of the hopper at distances from the packing. By these measures the additional advantage is obtained of a great reliability of operation of the centrifugal spreader, because the aggressive fertilizers are prevented from being forced into the sensitive bearings.

In a preferred embodiment, the invention furthermore provides that the hopper has, in a manner known in itself through German Pat. No. 2,344,346, two lower portions of a funnel-like configuration equipped with discharge outlets and separated by a gable-shaped center part, a great lateral distance being provided between the spreader means situated beneath them and the two spreader means being driven through three angle drives connected to one another by a cross shaft; that the agitator is equipped with agitator elements situated in each lower hopper part, and that the means for the driving of the agitator is situated beneath the gable-like central part and is connected to the cross shaft. These measures first of all produce the advantages of a large hopper capacity and a greater effective spreading width for the same driving velocity and design of the spreader means. Also, even in the case of different spreading characteristics of the types of fertilizer, the spreading pattern will always be symmetrical with the center of the spreading machine. This is because, in contrast to the known centrifugal spreader described in the beginning, the agitator elements sweep in the same direction past the discharge outlets provided on both sides, so as to assure that the streams of fertilizer will fall on them in an identical position. By the division of the bottom portion of the hopper into two equal parts an additional possibility is provided for checking to see that the flow of the fertilizers from the discharge outlets is equal. Thus, the driver of the tractor drawing the centrifugal spreader can quickly detect the partial or complete clogging of a discharge outlet and provide for the remedy thereof.

Furthermore, the arrangement of the agitator drive underneath the gable-shaped middle part makes possible a compact construction of the entire drive mechanism. If the agitator shaft is carried in a hollow shaft which extends to a point beyond the bearings of the agitator shaft, the additional advantage is achieved of a simple installation and removal of the entire agitator. An additional advantage is achieved in this connection by situating the middle angle drive and the agitator drive system in a fully enclosed transmission casing. This advantge consists in the fact that not even small amounts of fertilizer dust can adhere to the working parts of the drive and destroy them by corrosion.

Furthermore, since the transmission casing is affixed to the gable-shaped middle part, an especially sturdy construction of the entire centrifugal spreader is advantageously achieved, regardless of whether the agitator drive consists of a chain, belt or gear drive or a freewheel drive which is known in itself through German Pat. No. 1,782,752. If the stroke of the freewheel of the freewheel drive is variable, the movement of the agitator can be adapted in an additionally advantageous manner to the individual types of fertilizer.

Inasmuch as, in accordance with the invention, a plate cantilevered towards the spreading side is provided in a disengageable arrangement, it is possible to achieve an even spreading action all the way to the edge of the field, even in the case of the one-sided spreading of fertilizers on marginal strips of fields.

For the purpose of a precise maintenance of the spreading widths there is great importance also in the measure according to which, in the manner disclosed by German Offenlegungsschrift No. 1,557,916, when the aperture cross sections of each discharge outlet is increased, the stream of fertilizer passing through the aperture cross section onto the spreader means beneath it shifts in its direction of rotation as well as outwardly. For it is in this manner that the so-called flow-rate effect is excluded, i.e., the peculiarity seen also in the centrifugal spreader described in the beginning, according to which the effective spreading width changes as the cross-sectional aperture of the discharge outlets changes.

Lastly, the invention provides that the transmission casings of the angle drives form the bottom rest surface for the centrifugal spreader, that the overall height of the centrifugal spreader amounts to not more than 950 mm, and that the vertical distance between the supporting surfaces of the transmission casing and the bottom plates of the hopper is at least approximately equal to one-fourth of the total height of the centrifugal spreader. These measures create the conditions needed so that, despite the advantageous large capacity and hence the economical use of the centrifugal spreader, the loading of its hopper will be convenient whether by hand or by means of the dump body of a truck, in conjunction with the so-called "loose fertilizer chain".

Figure 2:
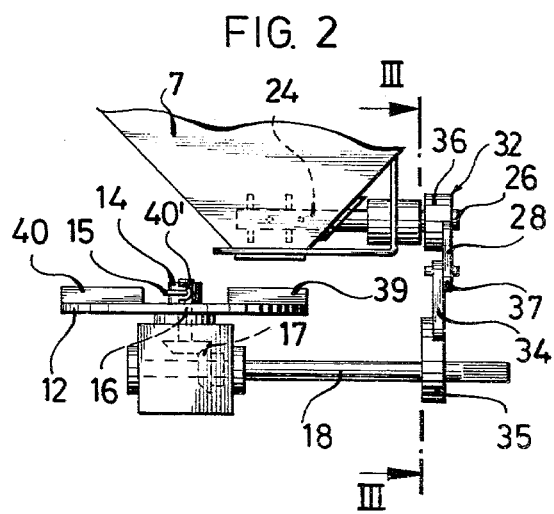
Figure 3:
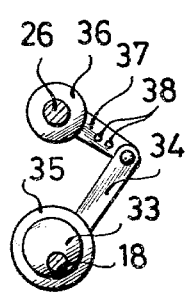

The invention will now be further explained with the aid of the appended drawings, wherein:

FIG. 1 is a longitudinal cross-sectional view of a centrifugal spreader according to the invention, FIG. 2 is a side elevational view of another means of driving the agitator of the same centrifugal spreader, FIG. 3 is a cross section of the same drive means taken along the line III—III, FIG. 4 is an enlarged longitudinal cross-sectional view of the bottom portion of the hopper of the same centrifugal spreader, FIG. 5 is a cross section of the lower part of the hopper taken along the line V—V, FIG. 6 is a rear elevational view of another centrifugal spreader according to the invention, FIG. 7 is a reduced diagrammatical representation of the unilateral spreading by the centrifugal spreader of FIG. 6, and FIG. 8 is also a graphic representation of the spreading pattern of the unilateral spread.

The centrifugal spreader represented in FIGS. 1 to 5 has a frame 1 which is equipped on its front side, as seen in the direction of travel 2, with the coupling means 3 and 4 for attachment to the top link 5 and the two lower lift arms 6 of the hydraulic three-point hitch of a tractor. The funnel-shaped hopper 7 is fastened to frame 1, and the discharge outlet 10 is provided in its bottom plate 8 and can shut it or be set for various aperture sizes.

Beneath the discharge outlet 10 there is provided the spreader means 11, which consists essentially of the centrifugal disk 12 and the two throwing shovels 13 turned upwardly at an angle, and can be mounted in an easily releasable manner on the drive shaft 16 by means of the sleeve-like fastening means 14 and the spring pin 15. An especially great effective spreading width is achieved with such a spreader means 11. Since the fertilizer particles are flung upwardly at an angle by the throwing shovels 13, the centrifugal spreader equipped wit such a spreader means 11 can also be used for so-called late-season or "bolt" fertilizing.

The spreader means 11 is driven through the angle drive 17, the main drive shaft 18 and the tumbler shaft 19 indicated by the broken line and attached to the power take-off shaft of the tractor pulling the centrifugal spreader. In this case the angle drive 17 has a step-up ratio of 1:1.3, so that at the standard rotatory speed, the tractor's power take-off shaft speed of 540 revolutions per minute produces a speed in the spreader means 11 of approximately 700 revolutions per minute.

For the removal of the spreader means 11 from its shaft 16, which is situated outside of the hopper 7, it is necessary only to turn the spreader disk 12 approximately 90°, so that the throwing shovels 13 come into the position 13'. In this position, the vertical distance A between the maximum height 20 of the spreader means 11 at the upper edge of the throwing shovels 13 and the point 21 above it on the rear wall 22 of hopper 7 is greater than the distance B between the bottom end 23 of the fastening means 14 and the upper end of the drive shaft 16.

Above the discharge outlet 10, in the lower portion of the hopper 7, is the agitator 24, whose shaft 26, equipped with the agitator elements 25, is passed through the front wall 27 of the hopper 7 and is driven by the main drive shaft 18 through the transmission 28 in the form of the chain drive 29. The transmission 28 has a step-down ratio of 2.5:1, so that the agitator 24 rotates in operation at a speed of approximately 215 revolutions per minute if the main drive shaft 18 is connected to a power take-off shaft of the standard speed of 540 revolutions per minute.

For the precise determination of the setting of the aperture size at discharge outlet 10 for a particular rate of application per unit of area for any type of fertilizer, the spreader means 11 is rotated until the throwing shovels 13 are in the position 13'. After the spring pin 15 has been removed, the spreader means 11 can then be pulled upwardly away from the drive shaft 16. This leaves the open space 30 between the discharge outlet 10 and the catch bucket 31 which can be slid into place on the frame 1. The transmission 28 then need only be operated for a period of time corresponding to the passage of the spreader over a measured distance, causing the fertilizer to pour from the discharge outlet 10 into the catch bucket 31 which can then be easily removed for weighing.

In the case of the embodiment represented in FIGS. 2 and 3, the transmission 28 of the agitator 24 consists of the free-wheeling transmission 32. This transmission has a disk 33 fastened excentrically to the main drive shaft 18, and having rotatably mounted on its circumference the ring 35 equipped with the lever 34. The freewheel 36, whose stroking arm 37 is articulated to the lever 34, is disposed on the drive shaft 26 of the agitator 24, above the disk 33.

In the arrangement of the lever 34 on the stroking arm 37 represented in FIG. 3, the agitator shaft 26 is rotated over an angle of 36° by each full revolution of the main drive shaft 18, so that, when the main drive shaft 18 is coupled to the tractor power take-off set for the standard speed of 540 revolutions per minute, the agitator 24 will operate at a speed of 54 rpm. At this low speed the agitator 24 is particularly well suited for the spreading of high-nitrogen fertilizers in prilled form, such as those of the urea type made up of very soft grains. To enable this speed to be increased so as to adapt the agitator 24 to the spreading of other types of fertilizers, additional bores 38 situated closer to the freewheel 36 are provided in the stroking arm 37, and it is necessary only to attach the lever 34 to them.

The embodiment represented in FIG. 2 differs from that of FIG. 1 only in that the spreader means 39 is attached by means of the spring pin 15 to the driven shaft 16 extending upwardly from the angle drive 17, so that it can easily be released. This spreader means 39 consists again of the sleeve-like fastening means 14 and the centrifugal disk 12, on which, however, the two straight throwing shovels 40 are mounted.

This spreader means 39 is designed mainly for the even spreading of coarsely granular fertilizers, for which a lower initial velocity suffices for the attainment of the same spreading widths as the finely granular types of fertilizers. For its removal from the drive shaft 16, the spreader disk 12 again needs only to be turned until the throwing shovels 40 are in the position 40' in FIG. 2.

As seen in FIG. 4, in the case of the agitator 24, the agitator elements 25 are standard spring pins 41 which are passed through the agitator shaft 26. Furthermore, the shaft packing 42 is removably situated on the front wall 27 of the hopper 7 and seals off the shaft 26 and closes the opening 43 provided in the front wall 27. The bearings 44 of the agitator shaft are disposed outside of the hopper 7 at distances from the packing 42.

Furthermore, FIG. 4 shows, in conjunction with FIG. 5, that the bottom plate 8 provided with the discharge outlet 10 is provided on three sides with a turned margin 45 whereby it is held in an easily releasable manner on a plate 46 welded to the hopper. The bottom plate 8 is secured against lateral displacement by the pin 47 which is held in place by the snap ring 48 and additionally serves as a pivot for the shutter 49 serving for the closing or adjustment of the discharge outlet 10. To prevent the shutter 49 from rusting against the bottom plate 8, the latter is made of corrosion-resistant stainless steel. Also, the casing 51 of the bearings 44 of agitator shaft 26 is releasably fastened to the front, upwardly bent end 50 of the plate 46.

As represented in FIG. 5, the discharge outlet 10 is of a size amounting to more than one-fourth of the internal area 52. The shape and position of the outlet 10 and the arrangement of the shutter 49 is such that, as the aperture cross section 53 of the discharge outlet 10 increases, the center 54 of the stream of fertilizer flowing from the cross section shifts on the disk 12 beneath it to its outer position 54' along a line 55 extending from the minimum aperture in the direction of rotation the disk 12 indicated by the arrow 56, and simultaneously outwardly. To permit the aperture 53 of the discharge outlet 10 to be adjusted from the driver's seat of the tractor pulling the centrifugal spreader, the shutter 49 is connected by the link 57 to an actuator means which is known and therefore not shown.

In the embodiment represented in FIG. 6, of a centrifugal spreader according to the invention, the hopper 58 has two funnel-shaped hopper bottoms 60 which are separated from one another by the gable-shaped middle part 59, in which the bottom plates 8, each provided with a discharge opening 10, are constructed in the same manner as in the embodiments described above. Beneath the discharge openings 10 the spreader means 39 are again releasably held on their shafts 61 by means of a spring pin 15, a greater distance C being provided between these two spreader means 39.

The spreader means 39 are driven through the two external angle drives 62, the cross shaft 63 and the central angle drive 64 which is coupled to the power take-off shaft of the tractor drawing the centrifugal spreader, in the same manner as the angle drive 17 of the embodiment described previously. The left spreader means 39 is in the position for removal, while the right spreader means would have to be rotated 90° for removal. As in the embodiments described above, these spreader means can be exchanged for the spreader means 11 or other kinds of spreader means according to the kind of spreading to be performed or the kind of fertilizers that are to be spread.

Above the cross shaft 63 is the agitator 65 whose shaft 66, in the same manner as in the embodiments described above, is brought through the side walls 67 of the gable-shaped divider 59 into the lower hopper portions 60 and is equipped above the discharge openings 10 with agitator elements 25 in the form of spring pins 41. To facilitate disassembly, part of the shaft 66 is surrounded by a hollow shaft 68 extending beyond the bearings 44. For the same reason, the opening 70 aligned with the shaft 66 is created in the side wall 69 of the left hopper portion 60 and is closed off by the releasably attached cover 71.

The drive means 28' for the agitator 65 consists of the gear drive 72 which is connected to the cross shaft 63. The gear drive 72 and the midle angle drive 64 are located in the fully enclosed transmission casing 73 beneath the gable-like middle part 59, while the two outer angle drives 62 are contained in the transmission casings 74. When the centrifugal spreader is set down on the ground, it rests on these casings 73 and 74. In this parked condition, the overall height H of the centrifugal spreader amounts to 950 mm, while the vertical distance D between the bottom surfaces 75 of the casings 73 and 74 and the bottom plates 8 of the hopper 58 amounts to 240 mm.

To improve the stability of the centrifugal spreader, the middle transmission casing 73 is joined fixedly but releasably by the support 76 to the gable-like middle part 59. Furthermore, the bucket holders 77 are provided for the hanging of a mass-produced catch bucket 78, so that, when the spreader means 39 are removed, the fertilizers pouring through the openings 10 and dropping through the free space 30 can be caught and weighed to determine the size of aperture of the discharge openings 10.

As represented in FIGS. 6 and 7, the plate 80 cantilevered on the spreading side 79 of the spreader is located in the center between the spreader means 39. This plate 80 has a bore to accommodate the hollow shafts 65 and is disposed for pivoting in a vertical plane in a bearing 81 attached to the middle transmission casing 73, so that it can be swung upwardly out of the range of the fertilizer being thrown out by the spreader means 39 and can be locked in this position on the middle part 59 by means of the hook 82.

When the plate 80 is in the engaged position and the discharge outlet 10 of the lower left hopper portion 60 is shut, and the discharge outlet 10 of the lower right hopper portion 60 is at least partially opened, the unilateral spreading operation represented in FIG. 7 can be performed. In this case the grains of fertilizer flung rearwardly and inwardly by the right-hand spreader means 39 as indicated by the broken lines 83 impinge upon the plate 80 and fall on the ground behind the middle area of the centrifugal spreader, while the other grains will be delivered in a broad fan to the soil over the trajectories indicated by the broken lines 84.

This produces the unilateral spreading pattern 87 on the ground surface 85 as indicated by the solid line 86 and the cross-hatching in FIG. 8, which tapers off to the right where it is overlapped by the next spreading pass indicated by the dash-dotted line 88 to achieve the desired application thickness S, i.e., to make up the amount of fertilizer that is to be applied per unit of surface area. Accordingly, the unilateral spreading pattern 87 drops off sharply on its left side, so that the fertilizers can be distributed to the full depth S on a marginal strip of the field, which is situated on this side.

For the sake of completeness, FIG. 8 also indicates by the broken lines 89 the spreading patterns which are produced in the normal, i.e., rectangular, spreading operation of the two spreader means 39. As it can be seen in this figure, the spreading patterns overlap in the central portion of the centrifugal spreader such that here, too, the full rate of application S corresponding to the setting of the outlet apertures 10 is achieved.

I claim:

1. In a centrifugal spreader, suitable for spreading granulated fertilizers, comprising a funnel-shaped hopper equipped with a bottom plate, means defining a discharge outlet in the bottom plate, adjustor means for adjusting the size of and shutting off the outlet, a rotatable agitator disposed in the hopper, a rotatable spreading means disposed beneath the hopper for receiving fertilizer issuing from the outlet and spreading the fertilizer, the spreading means being mounted on a drive shaft which terminates outside of the hopper, means for rotating the spreading means, means for rotating the agitator at a substantially lower speed than the speed of the spreading means, the spreading means being releasably mounted on a drive shaft and being exchangeable for a different spreading means and fastening means for said releasable mounting, the improvement which comprises means for positioning the spreading means to dispose same in a position in which the distance (A) situated between the highest point of the spreading means and the part of the hopper situated above said highest point as seen longitudinally of the drive shaft, is greater than the distance (B) between the lower edge of the fastening means of the spreader means and the upper end of the drive shaft, whereby removal of the spreading means is convenient, and means for attaching a catching container underneath the discharge outlet and below the position of the spreader means, and wherein, after removal of the spreader means from its drive shaft, a free space is present beneath the discharge outlet of the hopper for the passage of the fertilizer flowing out of the discharge outlet into a catching container attached as aforesaid.

2. Centrifugal spreader of claim 1, the bottom plate being releasably fastened to the hopper.

3. Centrifugal spreader of claim 2, the bottom plate being formed by corrosion-resistant material.

4. Centrifugal spreader of claim 1, and means for rotating the agitator at a maximum speed of 300 revolutions per minute from a power take-off shaft rotating at 540 RPM.

5. Centrifugal spreader of claim 1, or 2, the agitator comprising a shaft equipped with a plurality of removable agitator elements.

6. Centrifugal spreader of claim 5, the agitator comprising a shaft equipped with a plurality of removable agitator elements, the shaft of the agitator projecting laterally into the hopper from outside the hopper.

7. Centrifugal spreader of claim 5, the agitator elements being spring pins.

8. Centrifugal spreader of claim 1, the agitator elements being spring pins.

9. Centrifugal spreader of claim 6, comprising removable packing for the agitator shaft where it passes into the hopper, and bearings for the agitator shaft disposed outside of the hopper and spaced from the packing.

10. Centrifugal spreader of claim 1, comprising a second hopper, outfitted as aforesaid for the first mentioned hopper, and disposed laterally of the first mentioned hopper and joined thereto by a gable-like center part so that the spreading means are spaced apart by a lateral distance (C), a cross shaft outfitted with gearing for driving the cross shaft connected to the two spreader means for the driving thereof, the agitators being essentially formed by an agitator shaft disposed beneath the gable-like center part and projecting laterally into the hoppers from outside the hoppers, the shaft having a plurality of agitator elements within the hoppers, the means for driving the agitators driving both agitators and being connected to the cross shaft for the driving thereof off the cross shaft, the agitator shaft having a bearing adjacent each hopper beneath the gable-like center part, a central portion of the agitator shaft being contained in a hollow shaft which extends beyond the bearings of the agitator shaft.

11. Centrifugal spreader of claim 10, said gearing and the means for driving the agitators being disposed in a fully enclosed transmission casing.

12. Centrifugal spreader of claim 11, the transmission casing being affixed to the gable-like middle part.

13. Centrifugal spreader of claim 1 or 10, wherein the means for driving the agitator comprises a chain drive.

14. Centrifugal spreader of claim 1 or 10, wherein the means for driving the agitator comprises a gear drive.

15. Centrifugal spreader of claim 1 or 10, wherein the means for driving the agitator comprises a free-wheel mechanism.

16. Centrifugal spreader of claim 15, wherein the stroke of the free-wheel mechanism is variable.

17. Centrifugal spreader of claim 10, and a deflector plate cantilevered toward the spreading side disposed between the two spreading means in the path of fertilizer spread by the spreading means the deflector plate being moveable to a position without said path.

18. Centrifugal spreader of claim 1 or 10, the discharge outlet(s) being such that as the adjuster means is or are operated to increase the size of the discharge outlet(s) the center(s) of the mass of fertilizer flowing out of the discharge outlet(s) shifts on the spreading means in the direction(s) of rotation and outwardly.

19. Centrifugal spreader of claim 11 the drive means for each spreading means being mounted in a transmission casing, the three transmission casings forming bottom rest surfaces of the centrifugal spreader, the vertical distance (D) between the rest surfaces of the transmission casing and the bottom plates of the hoppers being about equal to one fourth of the overall height (H) of the centrifugal spreader.

20. Centrifugal spreader of claim 19, wherein the overall height (H) is not more than 950 mm.

* * * * *